(12) United States Patent
Chen

(10) Patent No.: US 7,628,117 B2
(45) Date of Patent: Dec. 8, 2009

(54) OVER TEMPERATURE ALARM INDICATION APPARATUS

(76) Inventor: Dongbing Chen, Room 10B, Building F of Haikuo Tiankong, Keyuan Rood South, Nanshan District, Shenzhen (CN) 518057

( * ) Notice: Subject to any disclaimer, the term of this patent is extended or adjusted under 35 U.S.C. 154(b) by 546 days.

(21) Appl. No.: 11/570,163

(22) PCT Filed: Mar. 13, 2006

(86) PCT No.: PCT/CN2006/000380

§ 371 (c)(1), (2), (4) Date: Dec. 7, 2006

(87) PCT Pub. No.: WO2007/104180

PCT Pub. Date: Sep. 20, 2007

(65) Prior Publication Data

US 2008/0278339 A1    Nov. 13, 2008

(51) Int. Cl.
*G01K 5/30* (2006.01)
(52) U.S. Cl. .................. 116/216; 374/106; 374/162
(58) Field of Classification Search ................ 116/216, 116/220; 374/100, 102, 105, 106, 159, 161, 374/162, 190, 193, 194, 201, 202
See application file for complete search history.

(56) References Cited

U.S. PATENT DOCUMENTS 1,589,294 A * 6/1926 Fusca .......................... 374/112
1,871,802 A * 8/1932 Lewellen ...................... 73/747
2,320,753 A * 6/1943 Schwartz ..................... 374/190
3,233,459 A * 2/1966 Loomis et al. ............... 374/106
3,915,004 A * 10/1975 Nollen et al. ................ 374/193
4,176,551 A * 12/1979 Hammer et al. ............. 374/161
4,457,253 A * 7/1984 Manske ....................... 116/216
5,215,378 A * 6/1993 Manske ....................... 374/105
7,415,939 B2 * 8/2008 Dip ............................. 116/216

FOREIGN PATENT DOCUMENTS

WO         WO 9119174 A1 * 12/1991
WO         WO 2007104180 A1 * 9/2007

* cited by examiner

*Primary Examiner*—R. A. Smith
(74) *Attorney, Agent, or Firm*—Global IP Services; Tianhua Gu

(57) ABSTRACT

The present invention relates to an over temperature alarm indication apparatus. In order to solve the problem of high cost in the prior art, the apparatus in the present invention comprises a first sealed and transparent container with fixed cubage and a second sealed and transparent container with variable cubage. Said first container and second container are connected through a thin tube, and a certain amount of liquid is filled in said thin tube; alarm indication material for generating color changing effects upon receiving liquid from said thin tube is provided in said first and second container; wherein the change of the environment temperature will cause the air in said first and second container to expand and shrink, and thus move said liquid in said tube. Therefore, said liquid outflows to the alarm indication material in the first container when the environment temperature reaches a lower threshold, and/or said liquid outflows to the alarm indication material in the second container when the environment temperature reaches an upper threshold.

15 Claims, 1 Drawing Sheet

OVER TEMPERATURE ALARM INDICATION APPARATUS

FIELD OF INVENTION

The present invention relates to temperature monitoring and alarm apparatus, more particularly, relates to a over temperature alarm indication apparatus that is capable of indicating environment temperature, and generating an alarm indicator when temperature reach a predefined lower threshold and/or a predefined upper threshold.

BACKGROUND OF THE INVENTION

There are many situations that temperature has to be monitored in manufacturing and everyday life, for example, in the storage and transportation of food, medicine, chemical medicine, temperature sensitive commodity, environment temperature are monitored thus to insure the environment temperature conform to the requirements. There are plurality of thermometers capable of indicating, recording environment temperature, and to generate a sound, light or other alarm signals, or to output corresponding temperature record by printing graphs, when temperature reach a predefined lower threshold and/or a predefined upper threshold. However, these products often require power supply, it is complex and voluminous, and the most important issue is cost inefficiency.

Currently, there is an over temperature alarm indication product without power supply, that is colour-variable temperature indicating label. This product does not require any external power supply, may stick on the object to be monitored directly to change colour according to the changes of environment temperature. Therefore, the observer may estimate whether the surface temperature of the object has exceeded the upper threshold according to the colour of the label. The disadvantages of this product are: low in indication precision, normally with ±2° C. error. The temperature coverage is normally between 50° C.-120° C.; in addition, the temperature indication step is often 5° C., therefore it is difficult to indicate a random temperature through the change of its colour; further, the cost of the product is high, therefore, it is difficult to popularize.

BRIEF SUMMARY OF THE INVENTION

The present invention provides an over temperature alarm indication apparatus with low cost, high precision, to solve the problem of high cost, low precision of the temperature alarm indication apparatus in the prior art.

The technical solution for solving the problems in the prior art is: to provide an over temperature alarm indication apparatus, comprises a first sealed and transparent container with fixed cubage and a second sealed and transparent container with variable cubage. Said first container and second container are connected through a thin tube, and a certain amount of liquid is filled in said thin tube; alarm indication material for generating colour changing effects upon receiving liquid from said thin tube is provided in said first and second container; wherein the change of the environment temperature may cause the air in said first and second container expand and shrink, thus to drive said liquid to move in said tube. Therefore, said liquid outflows to the alarm indication material in the first container when environment temperature reaches a lower threshold, and/or said liquid outflows to the alarm indication material in the second container when environment temperature reaches an upper threshold.

Advantageously, in order to achieve a variable cubage of said second container, at least one wall of said second container may employ a flexible film that its shape bulged or recessed according to the expansion and shrink of the air in the second container.

In another preferred embodiment of the present invention, said second container may be a second container with fixed cubage that connects with exterior, while remaining other features. The specific solution is to set an opening that connects with exterior on at least one wall of said second container.

Advantageously, a valve for controlling open and close state of the thin tube is set inside said thin tube. Said thin tube is preferably a transparent tube, and said liquid is preferably coloured liquid; scales for indicating present temperature according to the position of said liquid may also be provided on said transparent thin tube. Further, said alarm indication material may be fluorescent powder.

It is known from the above-discussed solutions that in the over temperature alarm indication apparatus of the present invention, the liquid in said thin tube may move according to the change of the environment temperature. In conjunction with the scales on said thin tube, it may also indicate a current temperature of the environment; when the environment temperature reaches a lower threshold and/or a upper threshold, the liquid in the thin tube will flow to the first or second container to cause the colour of the alarm indication material changed, thus to realize the effect of alarm indication. The over temperature alarm indication apparatus of the present invention does not require power supply. It is simple in structure, low in cost and high precision in alarming.

DETAILED DESCRIPTION OF THE INVENTION

Figure 1:
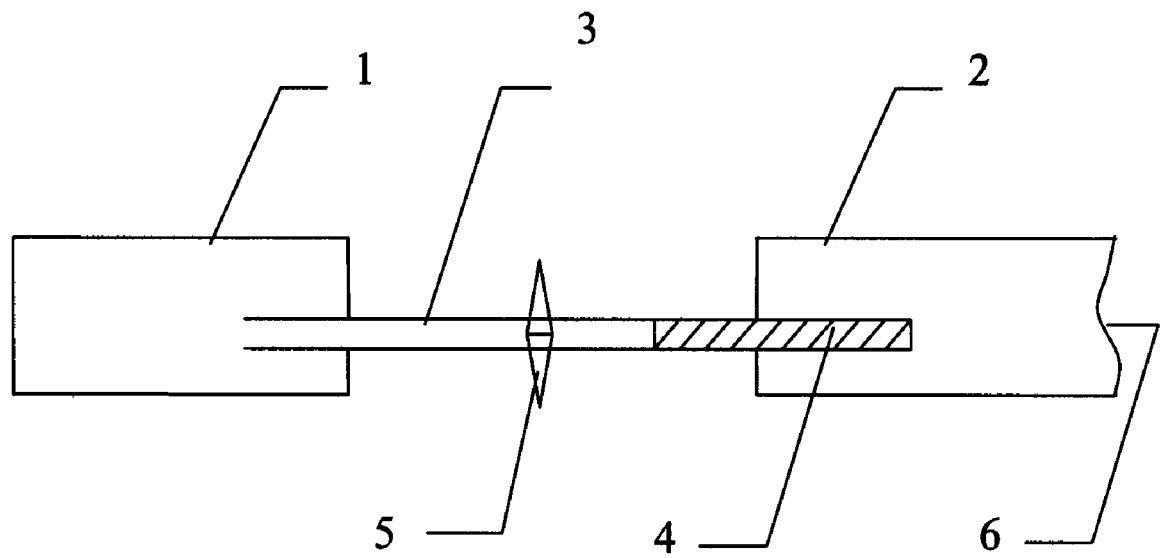
FIG. 1 is a structure diagram of a preferred embodiment of the over temperature indication apparatus, in accordance with the present invention.

A preferred embodiment of the present invention is shown in FIG. 1, wherein comprising a first container (a lower temperature threshold alarm container) 1, a second container (a upper temperature threshold alarm container) 2, a thin tube 3, coloured liquid in said thin tube 4, and a valve 5 installed in said thin tube 3.

As shown in FIG. 1, each wall of the container 1 is made of hard transparent material to form a sealed space with fixed cubage. The right side wall of the container 2 is made of a flexible film 6, while the other walls are made of hard transparent material. Since the flexible film 6 may bulge or recess its shape according to the expansion or shrink of the air in the container 2, a sealed and cubage-variable space is formed. The air in container 1 and the container 2 expands or shrinks when the environment temperature changes. However, the cubage of container 2 is adjustable by the flexible film 6. Therefore, no thrust or suction force is acted on the side of the container 2. On the other hand, due to the fixed cubage of the container 1, the expansion or shrink of the air therein will produce corresponding thrust or suction force, so as to drive the coloured liquid 4 moving left or right in thin tube 3.

In manufacture, firstly a certain amount of coloured liquid 4 is injected from the right end of the thin tube into the thin tube. Then when the environment temperature is equal to the upper temperature threshold, the container 1 and the container 2 are connected through said thin tube, and the right side of the coloured liquid 4 is exactly at the right end of said thin tube 3. The container 1 and the container 2 are then sealed to separate the internal air in these two containers from the external air. Finally, the valve 5 is closed for usage.

The length of the thin tube 3 may be determined according to the predefined upper temperature threshold and lower temperature threshold. Since the expansion and shrink of air is proportional to the environment temperature, therefore, the movement of the coloured liquid 4 in the thin tube 3 is proportional to the environment temperature, that is, a rise of 1° C. in the temperature may cause the coloured liquid move to the right side for a certain distance, for example, 5 mm; while a fall of 1° C. in the temperature may cause the coloured liquid move to the left side for a certain distance, for example, 5 mm. Take the difference between the upper threshold and lower threshold to multiply a temperature moving distance unit, then plus the length of the coloured liquid 4 in thin tube 3, the total length of the thin tube 3 is derived. For example, providing the upper temperature threshold is 10° C., the lower temperature threshold is 0° C., the length of coloured liquid 4 in thin tube 3 is 20 mm, then the total length of the thin tube 3 is: 10×5+20=70 mm. Accordingly, a corresponding scales may be provided on the thin tube 3, for example, 10 scales with step of 5 mm may be set on the thin tube 3 between the left side of the thin tube 3 and the left side of the coloured liquid 4 as shown in FIG. 1. In this case, the temperature value is read from the position of the left side of the coloured liquid. Alternatively, 10 scales with step of 5 mm may be set from the right side to the left side of thin tube. At such case, the temperature value is read from the position of the right side of the coloured liquid.

While in use, the valve 5 is open. In this embodiment, when the environment temperature is 5° C., the coloured liquid is at the middle of the thin tube 3; when the environment temperature rises, the air in the container 1 expands to drive the coloured liquid 4 in the thin tube 3 moving rightwards. When the environment temperature reaches 10° C., the position of the coloured liquid is shown in FIG. 1. With the environment temperature keeps rising, the coloured liquid 4 will outflow from the thin tube and drip onto the fluorescent powder in the container 2 to dye the fluorescent powder, thus to clearly indicate that the environment temperature has exceeded the upper temperature threshold.

Similarly, when the temperature keeps falling, the air in the container 1 shrinks to drive the coloured liquid 4 in the thin tube 3 moving leftwards; when the environment temperature reaches 0° C., the coloured liquid moves to the left end of the thin tube 3. At this point, if the environment temperature keeps falling, the coloured liquid 4 may drip onto the fluorescent powder in the container 1 to dye the fluorescent powder, thus to indicate the environment temperature is below the lower temperature threshold.

When the over temperature alarm indication apparatus is not in use, users may close the valve 5. Thereby the apparatus may be transported and stored in normal temperature. Before using the apparatus, it should be placed in an environment with temperature between the upper and lower threshold for a while. The valve may be opened after the temperature in the container 1 and the container 2 equals to the environment temperature.

In implementation, said apparatus may also be simplified, for example, taking out the valve 5. In this regard, it should be assured that the apparatus is stored, transported and installed in a temperature that between an upper and lower temperature threshold. Further, the coloured liquid in the apparatus may be replaced by other chemical liquid, and said fluorescent powder may be replaced by materials that change colour when reacts with said replaced chemical liquid.

Figure 2:
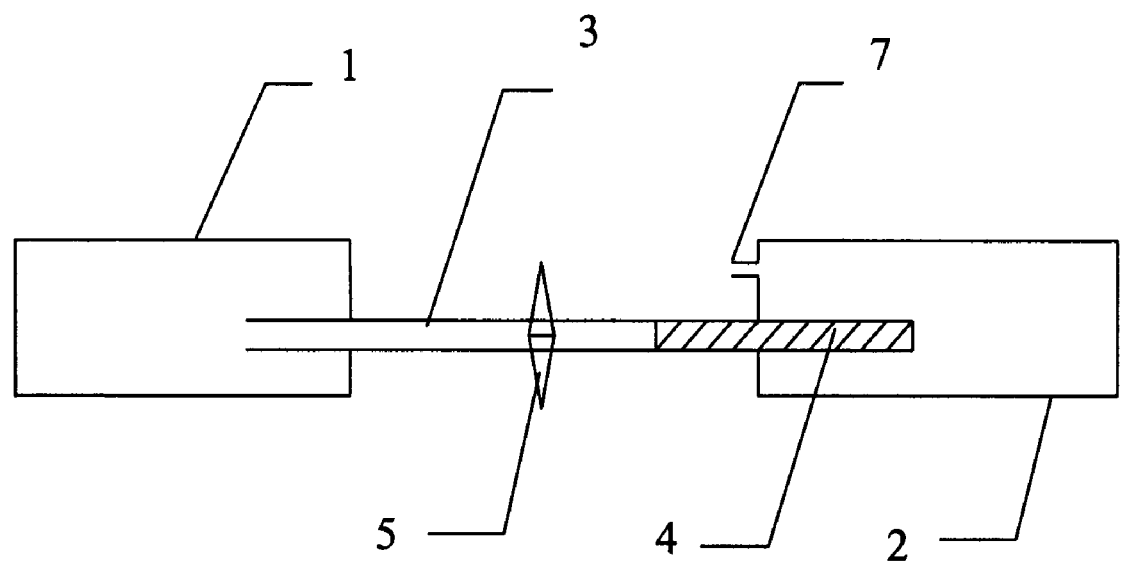
FIG. 2 is a structure diagram of another preferred embodiment of the over temperature indication apparatus, in accordance with the present invention.

Another embodiment of the present invention is shown in FIG. 2. As shown in FIG. 2, the difference is that each wall of the container 2 is made of hard transparent material without a flexible film 6. In order to assure only the air expansion and shrink in the container 1 affects the position of coloured liquid, an opening 7 is provided on the side wall of the container 2, thus to connect the container 2 with outside. Therefore, the position of coloured liquid will not be affected when air in the container 2 expands or shrinks. Other features of this embodiment are the same as the previous embodiment, as well as operational principle. Therefore, description of this embodiment will not be repeated.

What is claimed is:

1. An over temperature alarm indication apparatus, comprising:
   a first sealed and transparent container with fixed cubage and a second sealed and transparent container with variable cubage, said first container and second container are connected through a thin tube;
   a certain amount of liquid filled in said thin tube;
   alarm indication material in said first and second containers for generating colour changing effects upon receiving said liquid from said thin tube;
   the change of the environment temperature causes the air in said first and second containers to expand or shrink, thus to drive said liquid moving in said tube, and said liquid outflows to the alarm indication material in the first container when the environment temperature reaches a lower threshold, and/or said liquid outflows to the alarm indication material in the second container when the environment temperature reaches an upper threshold.

2. The apparatus according to claim 1, wherein at least one wall of said second container may employ a flexible film that bulges or recesses its shape according to the expansion or shrink of the air in the second container.

3. The apparatus according claims 2, wherein a valve for controlling open and close state of the thin tube is provided inside the thin tube.

4. The apparatus according to claims 2, wherein said thin tube is a transparent tube, and said liquid is coloured liquid.

5. The apparatus according to claim 4, wherein scales for indicating a present temperature according to the position of said liquid may be provided on said transparent thin tube.

6. The apparatus according to claim 4, wherein said alarm indication material may be fluorescent powder.

7. The apparatus according to claim 1, wherein
   said second sealed and transparent container has a fixed cubage with an opening that connects to outside.

8. The apparatus according claims 7, wherein a valve for controlling open and close state of the thin tube is provided inside the thin tube.

9. The apparatus according to claims 7, wherein said thin tube is a transparent tube, and said liquid is coloured liquid.

10. The apparatus according to claim 9, wherein scales for indicating a present temperature according to the position of said liquid may be provided on said transparent thin tube.

11. The apparatus according to claim 9, wherein said alarm indication material may be fluorescent powder.

12. The apparatus according claims 1, wherein a valve for controlling open and close state of the thin tube is provided inside the thin tube.

13. The apparatus according to claims 1, wherein said thin tube is a transparent tube, and said liquid is coloured liquid.

14. The apparatus according to claim 13, wherein scales for indicating a present temperature according to the position of said liquid may be provided on said transparent thin tube.

15. The apparatus according to claim 13, wherein said alarm indication material may be fluorescent powder.

* * * * *